(12) United States Patent
Kumar

(10) Patent No.: US 9,012,073 B2
(45) Date of Patent: *Apr. 21, 2015

(54) COMPOSITE COMPOSITIONS, NEGATIVE ELECTRODES WITH COMPOSITE COMPOSITIONS AND CORRESPONDING BATTERIES

(75) Inventor: Sujeet Kumar, Newark, CA (US)

(73) Assignee: Envia Systems, Inc., Newark, CA (US)

( * ) Notice: Subject to any disclaimer, the term of this patent is extended or adjusted under 35 U.S.C. 154(b) by 1277 days.

This patent is subject to a terminal disclaimer.

(21) Appl. No.: 12/502,609

(22) Filed: Jul. 14, 2009

(65) Prior Publication Data

US 2010/0119942 A1    May 13, 2010

Related U.S. Application Data

(60) Provisional application No. 61/113,445, filed on Nov. 11, 2008.

(51) Int. Cl.
*H01M 4/58* (2010.01)
*H01M 10/0525* (2010.01)
*H01M 4/38* (2006.01)

(52) U.S. Cl.
CPC ............ *H01M 10/0525* (2013.01); *H01M 4/38* (2013.01); *Y02E 60/122* (2013.01)

(58) Field of Classification Search
CPC ....................................................... H01M 4/58
USPC ............ 429/206, 223, 231.95, 152, 156, 158, 429/163, 164, 176, 178; 428/403
See application file for complete search history.

(56) References Cited

U.S. PATENT DOCUMENTS

| | | |
|---|---|---|
| 4,086,404 A | 4/1978 | Vissers et al. |
| 4,957,543 A | 9/1990 | Babjak et al. |
| 5,374,491 A | 12/1994 | Brannan et al. |
| 5,738,907 A | 4/1998 | Vaccaro et al. |
| RE35,818 E | 6/1998 | Tahara et al. |
| 6,171,723 B1 | 1/2001 | Loch et al. |
| 6,235,427 B1 | 5/2001 | Idota et al. |
| 6,251,822 B1 | 6/2001 | Peng et al. |
| 6,335,115 B1 | 1/2002 | Meissner |

(Continued)

FOREIGN PATENT DOCUMENTS

| | | |
|---|---|---|
| EP | 2079120 A2 | 7/2009 |
| EP | 2141759 A1 | 1/2010 |

(Continued)

OTHER PUBLICATIONS

Cui et al., "Carbon-silicon core-shell nanowires as high capacity electrode for lithium ion batteries," Nano Lett. 9(9):3370-3374 (2009) (Abstract only).

(Continued)

*Primary Examiner* — Patrick Ryan
*Assistant Examiner* — Alex Usyatinsky
(74) *Attorney, Agent, or Firm* — Dardi & Herbert, PLLC; Peter S. Dardi

(57) ABSTRACT

Compositions are described that can provide high energy density active materials for use in negative electrodes of lithium ion batteries. These materials generally comprise silicon and/or tin, and may further comprise carbon and/or zinc as well as other elements in appropriate embodiments. The active materials can have moderate volume changes upon cycling in a lithium ion battery.

26 Claims, 1 Drawing Sheet

(56) References Cited

U.S. PATENT DOCUMENTS

| | | | |
|---|---|---|---|
| 6,383,687 B1 | 5/2002 | Gibbons et al. | |
| 6,528,208 B1 | 3/2003 | Thackeray et al. | |
| 6,638,662 B2 | 10/2003 | Kaneda et al. | |
| 6,645,671 B2 | 11/2003 | Tsutsumi et al. | |
| 6,677,082 B2 | 1/2004 | Thackeray et al. | |
| 6,680,143 B2 | 1/2004 | Thackeray et al. | |
| 6,699,336 B2 | 3/2004 | Turner et al. | |
| 6,730,429 B2 | 5/2004 | Tackeray et al. | |
| 6,749,648 B1 | 6/2004 | Kumar et al. | |
| 6,855,460 B2 | 2/2005 | Vaughey et al. | |
| 6,899,970 B1 | 5/2005 | Rogers et al. | |
| 6,979,513 B2 | 12/2005 | Kelley et al. | |
| 7,026,074 B2 | 4/2006 | Chen et al. | |
| 7,195,842 B1 | 3/2007 | Fujimoto et al. | |
| 7,205,072 B2 | 4/2007 | Kang et al. | |
| 7,229,717 B2 | 6/2007 | Yamaguchi et al. | |
| 7,235,330 B1 | 6/2007 | Fujimoto et al. | |
| 7,252,907 B2 | 8/2007 | Takeuchi et al. | |
| 7,273,682 B2 | 9/2007 | Park et al. | |
| 7,297,446 B2 | 11/2007 | Fukui et al. | |
| 7,416,813 B2 | 8/2008 | Fujihara et al. | |
| 7,432,015 B2 | 10/2008 | Jeong et al. | |
| 7,435,402 B2 | 10/2008 | Kang et al. | |
| 7,452,631 B2 | 11/2008 | Kitao et al. | |
| 7,452,632 B2 | 11/2008 | Lee et al. | |
| 7,507,503 B2 | 3/2009 | Amine et al. | |
| 7,514,369 B2 | 4/2009 | Li et al. | |
| 7,517,614 B2 | 4/2009 | Jeong et al. | |
| 7,615,314 B2 | 11/2009 | Kawakami et al. | |
| 7,776,473 B2 | 8/2010 | Aramata et al. | |
| 7,851,085 B2 | 12/2010 | Obrovac et al. | |
| 7,871,727 B2 | 1/2011 | Obrovac et al. | |
| 2001/0031396 A1 | 10/2001 | Tsutsumi et al. | |
| 2003/0157014 A1 | 8/2003 | Wang et al. | |
| 2003/0157407 A1 | 8/2003 | Kosuzu et al. | |
| 2003/0211390 A1 | 11/2003 | Dahn et al. | |
| 2004/0023117 A1 | 2/2004 | Imachi et al. | |
| 2004/0033419 A1 | 2/2004 | Funabiki | |
| 2004/0146734 A1 | 7/2004 | Miller et al. | |
| 2004/0151951 A1 | 8/2004 | Hyung et al. | |
| 2004/0191630 A1 | 9/2004 | Kawamura et al. | |
| 2004/0241548 A1 | 12/2004 | Nakamoto et al. | |
| 2005/0019670 A1 | 1/2005 | Amine et al. | |
| 2005/0031942 A1 | 2/2005 | Hennige et al. | |
| 2005/0175901 A1 | 8/2005 | Kawakami et al. | |
| 2005/0233213 A1 | 10/2005 | Lee et al. | |
| 2006/0040182 A1 | 2/2006 | Kawakami et al. | |
| 2006/0051673 A1 | 3/2006 | Johnson et al. | |
| 2006/0068285 A1* | 3/2006 | Yamaguchi et al. | 429/218.1 |
| 2006/0115734 A1* | 6/2006 | Ishihara et al. | 429/231.8 |
| 2007/0048612 A1 | 3/2007 | Nakajima et al. | |
| 2007/0148544 A1 | 6/2007 | Le | |
| 2008/0113269 A1 | 5/2008 | Yamamoto et al. | |
| 2008/0131772 A1 | 6/2008 | Jambunathan et al. | |
| 2008/0193831 A1 | 8/2008 | Mah et al. | |
| 2009/0029256 A1 | 1/2009 | Mah et al. | |
| 2009/0092899 A1 | 4/2009 | Treger | |
| 2009/0117466 A1* | 5/2009 | Zhamu et al. | 429/231.8 |
| 2009/0130562 A1 | 5/2009 | Mao et al. | |
| 2009/0186267 A1 | 7/2009 | Tiegs | |
| 2009/0263707 A1 | 10/2009 | Buckley et al. | |
| 2009/0305131 A1 | 12/2009 | Kumar et al. | |
| 2009/0317721 A1 | 12/2009 | Shirane et al. | |
| 2009/0325061 A1 | 12/2009 | Lim | |
| 2010/0047671 A1 | 2/2010 | Chiang et al. | |
| 2010/0086853 A1 | 4/2010 | Venkatachalam et al. | |
| 2010/0086854 A1 | 4/2010 | Kumar et al. | |
| 2010/0151332 A1 | 6/2010 | Lopez et al. | |
| 2011/0017528 A1 | 1/2011 | Kumar et al. | |
| 2011/0052981 A1 | 3/2011 | Lopez et al. | |
| 2011/0052989 A1 | 3/2011 | Venkatachalam et al. | |
| 2011/0076556 A1 | 3/2011 | Karthikeyan et al. | |
| 2011/0085960 A1 | 4/2011 | Mukasyan et al. | |
| 2011/0111294 A1 | 5/2011 | Lopez et al. | |
| 2011/0111298 A1 | 5/2011 | Lopez et al. | |
| 2011/0136019 A1 | 6/2011 | Amiruddin et al. | |
| 2011/0244331 A1 | 10/2011 | Karthikeyan et al. | |
| 2012/0028105 A1 | 2/2012 | Kumar et al. | |
| 2012/0056590 A1 | 3/2012 | Amiruddin et al. | |
| 2012/0105007 A1 | 5/2012 | Amiruddin et al. | |
| 2012/0107680 A1 | 5/2012 | Amiruddin et al. | |

FOREIGN PATENT DOCUMENTS

| | | |
|---|---|---|
| KR | 1020040096381 A | 11/2004 |
| KR | 1020040100058 A | 12/2004 |
| KR | 10-0493960 B1 | 6/2005 |
| KR | 1020060087003 A | 8/2006 |
| KR | 1020060087183 A | 8/2006 |
| WO | 01/35473 A1 | 5/2001 |
| WO | 2005/065082 A2 | 7/2005 |
| WO | 2005/076389 A2 | 8/2005 |
| WO | 2006/109930 A1 | 10/2006 |
| WO | 2007/126257 A1 | 11/2007 |
| WO | 2011/053736 A1 | 5/2011 |

OTHER PUBLICATIONS

Chan et al., "High performance lithium battery anodes using silicon nanowires," Nature Nanotechnology Jan. 2008, vol. 3, pp. 31-35.

Chen et al., "Electrochemical Insertion/extraction of Lithium in Multiwall Carbon Nanotube/Sb and SnSb0.5 Nanocomposites," published by the Massachusetts Institute of Technology, division of Molecular Engineering of Biological and Chemical Systems, Dec. 2003.

Kang et al., "Enchancing the rate capability of high capacity xLi2MnO3 . (1-x)LiMO2 (M=Mn, Ni, Co) electrodes by Li-Ni-PO4 treatment," Electrochemistry Communications 11 (2009) 748-751.

Kang et al., "Layered Li(Li0.2Ni0.15+0.5zCo0.10Mn0.55-0.5z)O2-zFz cathode materials for Li-ion secondary batteries," Journal of Power Sources 146 (2005) 654-657.

Kim et al., "Synthesis of spherical Li{Ni(1/3-z)Co(1/3-z)Mn(1/3-z)Mgz]O2 as positive electrode material for lithium ion battery," Electrochemica Acta 51 (2006)2447-2453.

Kim et al., "Improvement of High-Voltage Cycling Behavior of Surface Modified Li[Ni1/3Co1/3Mn1/3]O2 Cathodes by Fluorine Substitution for Li-Ion Batteries," Journal of the Electrochemical Society 152 (9) A1701-A1713 (2005).

Lee et al., "High capacity Li[Li0.2Ni0.2Mn0.6]O2 cathode materials via a carbonate co-precipitation method," J. of Power Sources, 162 (2006), 1346-1350.

Liu et al., "Electrical transport in doped multiwalled carbon nanotubes," Physical Review B, vol. 63, 161404(R), pp. 1-4 (2001).

Schoenenberger et al., 2009 "Multiwall carbon nanotubes," http://physicsworld.com/cws/article/print/606.

Shi et al., "Nano-SnSb alloy deposited on MCMB as an anode material for lithium ion batteries," J. Materials Chemisrty vol. 11(5) pp. 1502-1505 (2001).

Sun et al., "AlF3-Coating to Improve High Voltage Cycling Performance of Li[Ni1/3Co1/3Mn1/3]O2 Cathode Materials for Lithium Secondary Batteries," J. of the Electrochemical Society, 154 (3), A168-A172 (2007).

Sun et al., "Significant Improvement of high voltage cycling behavior AlF3-coated LiCoO2 cathode," Electrochemistry Communications 8 (2006) 821-826.

Thackeray et al., "Comments on the structural complexity of lithium-rich Li1+xM1-xO2 electrodes (M=Mn,Ni,Co) for lithium batteries," Electrochemistry Communications 8 (2006), 1531-1538.

Woo et al., "Significant Improvement of Electrochemical Performance of AlF3-Coated Li[Ni0.8Co0.1Mn0.1]O2 Cathode Materials," J. of the Electrochemical Society, 154 (11) A1005-A1009 (2007).

Yoshio et al., "Electrochemical behaviors of silicon based anode material," Journal of Power Sources 146:10-14 (2005) (Abstract).

* cited by examiner

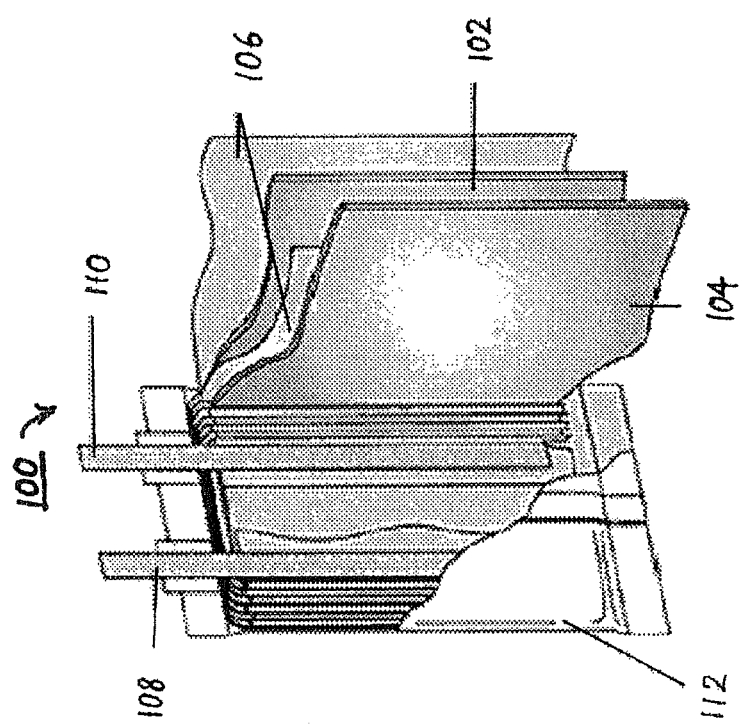

COMPOSITE COMPOSITIONS, NEGATIVE ELECTRODES WITH COMPOSITE COMPOSITIONS AND CORRESPONDING BATTERIES

CROSS REFERENCE TO RELATED APPLICATIONS

This patent application claims priority to U.S. provisional patent application Ser. No. 61/113,445 filed Nov. 11, 2008 to Kumar, entitled "Intermetallic Compositions, Negative Electrodes with Intermetallic Compositions and Batteries" incorporated herein by reference.

FIELD OF THE INVENTION

The inventions, in general, are related to negative electrode intermetallic compositions with high energy density and good cycling efficiency. The inventions are further related to high energy density negative electrode and high energy lithium ion batteries constructed from the high energy density negative electrode compositions, as well as corresponding methods.

BACKGROUND

Lithium batteries are widely used in consumer electronics industry due to their high energy density. For some current commercial batteries, the negative electrode material can be graphite, and the positive electrode materials can comprise lithium cobalt oxide ($LiCoO_2$), lithium manganese oxide ($LiMn_2O_4$), lithium iron phosphate ($LiFePO_4$), lithium nickel oxide ($LiNiO_2$), lithium nickel cobalt oxide ($LiNiCoO_2$), lithium nickel cobalt manganese oxide ($LiNiMnCoO_2$), lithium nickel cobalt aluminum oxide ($LiNiCoAlO_2$) and the like. For negative electrodes, lithium titanate is an alternative to graphite with good cycling properties, but it has a lower energy density. Other alternatives to graphite, such as tin oxide and silicon, have the potential for providing increased energy density. However, these other alternatives for negative electrode materials have been found to be unsuitable commercially due to poor discharge and recharge cycling related to structural changes and anomalously large volume expansions, especially for silicon, that are associated with lithium intercalation/alloying. The structural changes and large volume changes can destroy the structural integrity of the electrode, thereby decreasing the cycling efficiency.

SUMMARY OF THE INVENTION

In a first aspect, the invention pertains to a composition comprising a material characterized by the formula $Si_wSn_xM_yC_z$, where w, x, y and z are weight percents, $w \geq 0$, $3 \leq x \leq 25$, $y \geq 0$, $50 \leq z \leq 95$, $1 \leq (w+y) \leq 35$, and M is a metal atom selected from the group consisting of Fe, Ni, Co, Mn, Zn, V, Cr, Mo, Nb, Ta, Zr, B, Al, Ti, Mg and combinations thereof.

In a further aspect, the invention pertains to a composition comprising a material characterized by the formula $Si_wSn_xM_yC_z$, where w, x, y and z are weight percents, $10 \leq w \leq 70$, $8 \leq x \leq 50$, $y \geq 0$, $z \geq 0$, $5 \leq (y+z) \leq 50$, and M is a metal atom selected from the group consisting of Fe, Ni, Co, Mn, Zn, V, Cr, Mo, Nb, Ta, Zr, B, Al, Ti, Mg and combinations thereof.

In another aspect, the invention pertains to an intermetallic composition comprising a material characterized by the formula $Si_wZn_xSn_yC_z$, $Cu_wZn_xSn_yC_z$ or combinations thereof where w, x, y and z are weight percents and w, x, y, and z are each greater than 1

Furthermore, the invention pertains to a secondary lithium ion battery comprising a negative electrode, a positive electrode comprising a lithium intercalation composition and a separator between the positive electrode and the negative electrode, wherein the negative electrode comprises a composition as described in the previous three paragraphs.

BRIEF DESCRIPTION OF THE DRAWINGS

FIG. 1 is a schematic diagram of a pouch cell battery in accordance with an exemplary embodiment.

DETAILED DESCRIPTION OF PREFERRED EMBODIMENTS

Improved anode active materials described herein are composite compositions that have large specific energy while maintaining good cycling properties. In particular, some components of the composite can contribute to large energy, current and/or power capacities while other components of the composite may particularly contribute to increased cycling stability. In some embodiments, the composite compositions can be in the form of powders having small particle sizes, high surface area and/or an amorphous structure with respect to some large capacity phases. The amorphous structure of some phases can result in less stress upon lithium uptake and release compared to corresponding crystalline materials. In general, the composite compositions can comprise elemental tin that contributes to the large capacity of the negative electrode compositions. The composite compositions can have other active phases such as graphitic carbon and/or elemental silicon.

Lithium has been used in both primary and secondary batteries. An attractive feature of lithium metal is its light weight, and lithium is the most electropositive metal. Aspects of these features can be advantageously captured in lithium ion batteries. Certain forms of metals, metal oxides, and carbon materials are known to incorporate lithium ions into their structure through intercalation, alloying or similar mechanisms. Lithium ion batteries refer to batteries in which the negative electrode active material is also a lithium intercalation material or, a lithium alloying material. Significant improvements in energy density of cathode active materials are reported in copending patent application Ser. No. 12/246,814 to Venkatachalam et al. filed Oct. 7, 2008 entitled "Positive Electrode Materials for Lithium Ion Batteries Having a High Specific Discharge Capacity and Processes for the Synthesis of these Materials", and copending patent application Ser. No. 12/332,735 to Lopez et al. filed Dec. 11, 2008 entitled "Positive Electrode Materials for High Discharge Capacity Lithium Ion Batteries", both of which are incorporated herein by reference. These cathode active materials with improved energy density have been used to construct high energy lithium ion secondary batteries such as those described in copending patent application Ser. No. 12/403,521 to Buckley et al. filed Mar. 13, 2009 entitled "High Energy Lithium Ion Secondary Batteries", incorporated herein by reference.

In the design of the battery, the capacity of the positive electrode and negative electrode can be relatively balanced, generally with a slight excess negative electrode capacity to reduce the risk of lithium metal depositing during recharging of the battery. To accommodate the increased energy density of the cathode active material and high energy density positive electrode constructed from these materials, negative electrodes can be produced with active materials that also have high energy density. Thus, if a high energy density positive electrode active material is used, the incorporation of a high energy density negative electrode active material provides for better balance of the positive electrode and negative electrode with respect to thickness and other parameters, which may lead to better cell performance. In some embodiments, improved negative electrode structures described herein use high energy composite active materials with good cycling property. In particular, as described in detail below, these composite active materials generally comprise tin as a component.

Furthermore, the negative electrode active material generally comprises a composite composition, in which silicon and/or carbon can be present along with tin in the materials. Silicon can be described as a semi-metal or metalloid. In general, the composite composition can comprise a single phase or multiple phases. If the material has crystalline phases and amorphous phases, these phases can be segregated into domains, which may or may not be ordered on the same scale as the particle sizes themselves. It can be difficult to evaluate the precise microscopic nature of the materials, and the general description of the materials herein is not dependent on an understanding of the precise microscopic nature of the materials.

In some embodiments, the composite materials can comprise a phase that comprises alloys and/or intermetallic compositions. Intermetallic compositions generally are solid materials with a homogeneous phase having two or more metal or metalloid elements with a structure that differs discontinuously with respect to the structure of the constituent metals or metalloids. Intermetallic compositions can optionally comprise non-metal atoms. For the purposes of evaluating the number of metal and/or metalloid elements in the intermetallic composition, elemental carbon can be considered a metalloid. Alloys refer to metallic compositions that are homogenous mixtures with mixtures of metal atoms or one or more metal elements with one or more non-metal elements. While many alloys have a plurality of metal elements, some alloys are alloys of a metal with a relatively low amount of a non-metal additive. For example, steel is an alloy formed from iron with a low amount of carbon additive in a homogenous metallic composition.

The composite compositions described herein generally comprise elemental tin, which is an active material in a negative electrode of a lithium ion battery. The tin forms an alloy with lithium during lithium uptake. The elemental tin of the composite composition may or may not be in the form of an alloy and/or intermetallic within the composite. Elemental tin has a relatively large specific capacity as a negative electrode active material in lithium ion batteries. However, elemental tin generally has poor cycling performance due to large structural changes upon cycling in a lithium ion battery electrode. The incorporation of elemental tin into a composite composition as described herein can help to stabilize the tin during cycling. Also, the structure of the composite composition can encourage the formation and maintenance of an amorphous tin structure that also facilitates stabilization of the structure during cycling.

Furthermore, elemental silicon itself can function as an active material for a negative electrode, and elemental silicon can be used in some of the composite compositions described herein, although silicon undergoes large volume changes when cycled in a lithium negative electrode. Elemental silicon has a large specific capacity as a negative electrode active material in lithium ion batteries. As with tin, silicon can essentially alloy with lithium. During cycling, the tin or silicon take up lithium such that the metals effectively alloys with lithium during the cell cycling after an initial charging of the cell, and the process can be more accurately described as an alloying process rather than an intercalation process, which generally takes place for metal oxides or the like. However, there is no desire to be bound by theory, and when the terms alloying and intercalation are used herein, these terms are intended to be interpreted in context as the appropriate physical process corresponding to the reduction/oxidation reaction taking place with a corresponding change in the material regardless of any arguments associated with the preciseness of the terminology. While silicon generally has very poor cycling performance, reasonable amounts of elemental silicon can be stabilized within the composite structure such that significant improvements in capacity can be obtained while maintaining reasonable cycling properties.

In some embodiments, the composite compositions comprise a significant amount of elemental carbon. Using a graphitic carbon starting material, a carbon phase of the composite composition can also be graphitic carbon, which is an active material in a negative electrode of a lithium ion battery. Graphitic carbon in moderately large amounts in the composite composition can contribute significantly to the stability of the negative electrode cycling. Furthermore, a graphitic carbon phase may contribute to the overall material stability during cycling involving additional active components of the composite, such as tin. Thus, elemental tin, alloys thereof and/or intermetallics thereof can be stabilized within the composite structure by the carbon phase, which provides a stable matrix for the material. In some embodiments, the composite composition can comprise at least about 50 weight percent of carbon. If both silicon and carbon are present, the silicon can be reactive such that silicon carbide is formed. While silicon carbide is inactive with respect to cycling of a lithium ion battery, modest amounts of silicon carbide can be acceptable. Possible beneficial contributions from inactive phases are discussed further below.

In addition to the active phases, the composite material can comprise components and/or phases that are effectively inactive that provide stability for the composite such that the tin and/or silicon phases can cycle with more stability. For example, if silicon is present during the synthesis process, silicon can react with carbon and some transition metals to form silicon carbide or metal silicides, respectively. If the formed materials are crystalline, these materials can encourage the maintenance of the tin and/or silicon in an amorphous state. In particular, silicon carbide generally forms a crystalline phase which can contribute to the amorphous structure of other phases, such as a phase comprising elemental tin. The amorphous state of silicon and tin is expected to have improved cycling performance relative to corresponding crystalline forms of the elemental materials. Thus, modest amounts of silicon carbide or metal silicides can improve the cycling properties of the composite.

Furthermore, the composites can also comprise other metals, such as transition metals. These other metals may alloy with the tin and/or silicon. Additionally, these other metals can form distinct phases, which may be inactive. If these other metals form distinct phases, these phases can be crystalline because elemental transition metals generally form crystalline phases. These other metals can be, for example, copper and/or zinc. In contrast, tin and/or silicon phase in the composite can be amorphous. The formation of a crystalline transition metal phase in the composite material can encourage the tin and/or silicon phase to have an amorphous character. Thus, the inert crystalline phase of the composite material functions as a stable matrix that provides more stable cycling and encourages an amorphous character for the tin phase and/or silicon phases, which further stabilizes the cycling of these materials.

In some embodiments, the composite compositions have a majority by weight carbon. These composite compositions can be characterized by the formula $Si_wSn_xM_yC_z$, where w, x, y and z are weight percents, w≥0, 5≤x≤25, y≥0, 50≤z≤95, 1≤(w+y)≤35, and M is a metal atom selected from the group consisting of Fe, Ni, Co, Mn, Zn, V, Cr, Mo, Nb, Ta, Zr, B, Al, Ti, Mg and combinations thereof. In these compositions, excess elemental carbon can function as an active material along with tin. The silicon generally reacts with the carbon and/or the metal to form corresponding silicon carbide or metal silicide component of the composite.

In further embodiments, the composites are selected to have both active tin and active silicon within a matrix that is intended to stabilize the cycling properties while the tin and silicon provide high specific capacities of the composite in a lithium ion battery. These composite compositions can be characterized by the formula $Si_wSn_xM_yC_z$, where w, x, y and z are weight percents, 10≤w≤70, 8≤x≤50, y≥0, z≥0, 5≤(y+z) ≤50, and M is a metal atom selected from the group consisting of Fe, Ni, Co, Mn, Zn, V, Cr, Mo, Nb, Ta, Zr, B, Al, Ti, Mg and combinations thereof. Due to the excess silicon, the carbon in these materials generally reacts to form silicon carbide, and the metal may or may not react to form corresponding metal silicides. The inactive silicon carbide and/or metal silicide can form a crystalline material that can contribute to more stabile cycling of the composite during discharge and recharging.

In additional embodiments, the composites can be characterized by the formula $Si_wZn_xSn_yC_z$, $Cu_wZn_xSn_yC_z$ or combinations thereof where w, x, y and z are weight percents and w, x, y, and z are each greater than 1. In these materials, the zinc and/or copper generally can form an alloy with the tin that then functions as an active material. Silicon or carbon may form another active material of the composite composition.

Multi-phased metal composites with the basic composition of $Si_xSn_qM_yC_z$ are described in published U.S. patent application 2007/0148544A to Le, entitled "Silicon-Containing Alloys Useful as Electrodes for Lithium-Ion Batteries," incorporated herein by reference. In general, this application focuses on materials in which silicon provides the active material. An excess of silicon was found to react with carbon and transition metal components to form corresponding silicon carbide or metal silicide. Two examples are provided with low amounts of tin. This application indicates that the silicon and tin phases are amorphous. In contrast, in some embodiments herein, the materials have a greater amount of active tin material and/or active carbon.

Metal blends are also described in U.S. Pat. No. 7,229,717 to Yamaguchi et al. (the '717 patent), entitled "Anode Active Material and Battery Using it," incorporated herein by reference. The materials in the '717 patent have tin as the active material, and the tin is generally present in relatively large amounts. The materials of the '717 patent further comprise a second element that is either carbon, boron, aluminum or phosphorous as well as a third element that is magnesium, bismuth, silicon, or a transition metal selected from a specified group. The second element is described as contributing to an amorphous character of the material. The '717 patent suggests that the composite materials are alloys, and the use of alloyed starting materials with respect to tin and the third element is stated to be desirable. However, it is not completely clear that a homogenous material is produced. This patent teaches that it is undesirable to have crystalline material of any form, and the '717 patent further teaches that the carbon content should be no more than 49 weight percent.

Crystalline intermetallic compositions comprising tin as an element of an alloy are described in U.S. Pat. No. 6,528, 208 to Thackery et al., entitled "Anodes for Rechargeable Lithium Batteries," incorporated herein by reference. These inter-metallic compositions comprised alloys, such as $Cu_6Sn_5$, $Cu_6Sn_6$, or $Cu_6Sn_4$ with tin as an active element and copper as an inactive element, or $Li_2CuSn$ or variations thereof ($Cu_{6-x}Ni_xSn_5$ or $Cu_{6-x}Zn_xSn_5$). These are described generally as being hexagonally close packed NiAs-type structures or defect-$Ni_2In$-type structures. However, the NiAs structure is hexagonally close packed that transforms to a cubic close pack structure upon lithiation such that a significant structural change takes place. Also, copper is ejected from the lattice upon lithiation. Negative electrode compositions with the structure $Cu_{6-x}M_xSn_5$, where x<=3 and M being one or more metals or Si, are described further in U.S. Pat. No. 6,730,429 to Thackery et al., entitled "Intermetallic Negative Electrodes for Non-Aqueous Lithium Cells and Batteries," incorporated herein by reference. However, these materials do not overcome cycling problems since elemental Cu is released from the lattice when lithium is intercalated into the material and this copper release results in undesirable structural changes in the material. Alternative crystalline inter-metallic compositions are described in U.S. Pat. No. 6,855,460 to Vaughey et al., entitled "Negative Electrodes for Lithium Cells and Batteries," incorporated herein by reference. This second group of crystalline inter-metallic compositions includes compounds with the formula $M_2M'$ having a $Cu_2Sb$-type structure, in which M and M' are two or more metal elements or silicon, for example, $Mn_2Sb$. These crystalline materials can have poor cycling due to ejection of metal, such as copper, from the lattice during lithium uptake. Amorphous alloys of metals for use in negative electrodes for lithium ion batteries are described in U.S. Pat. No. 6,699,336 to Turner et al., entitled "Amorphous Electrode Compositions," incorporated herein by reference.

While the composite materials described herein are generally intended to exhibit improved cycling properties, these composites can be further incorporated into electrode structures that can further stabilize the cycling properties of the materials. In particular, the composite particles can be incorporated into highly porous electrically conductive structures that provide expansion volumes within the material's pores, such as a foamed current collector or highly porous carbon particles. Since the added materials are electrically conductive, the impedance of the electrode generally is not diminished in an undesirable way. When composite materials as a powder are combined with foamed current collectors, the resulting electrode structure can have appropriate electrical conductivity such that a traditional metal foil current collector may not be incorporated into the structure. The foamed current collector or pores of the carbon particles can absorb at least a portion of the volume change of the negative electrode active material as the active material alloys/intercalates with lithium or releases lithium. The combinations of the materials can be particularly desirable with active composite particles having an average particle size of no more than about 1 micron. Generally, due to the ability to absorb the volume changes of the active materials, the negative electrodes can have improved cycling properties. Detailed discussion of porous conductive materials such as porous carbon or foamed current collector used in a negative electrode can be found in copending U.S. patent application Ser. No. 12/429,438 to Kumar et al. filed on Apr. 24, 2009, entitled "Lithium Ion Batteries with Particular Negative Electrode Compositions," incorporate herein by reference.

The composite negative electrode active materials described herein generally are formed as powders. As described further below, these powders can be formed by milling appropriate precursor powders together. In general, it can be desirable to use precursor particles with structures similar to the desired structure within the composite particles. Thus, for example, amorphous tin powders and graphite powders can be used as precursor materials. In some embodiments, the composite powders can be formed with an average particle size of no more than a micron. Powders with a submicron average particle size can have improved cycling properties due to the increased surface area. Specifically, due to the large surface area of the submicron particles, the packing of the particles may accommodate the volume changes with less disruption of the structure. Furthermore, the particles may adjust to the volume changes with reduced irreversible changes to the particle due to the smaller volume of the particles.

The composite materials described herein have been designed to exhibit improved performance as negative electrode materials for lithium ion batteries. In some embodiments, the composite compositions comprise a significant amount of active graphitic carbon that provides stabile cycling with increased capacity supplied by elemental tin that is provided in a stabilized format. In further embodiments, the composites are designed to have significant amounts of both active tin and active silicon, which are provided in a stabilized format generally with associated crystalline phases. In additional embodiments, the composite materials comprise alloys of tin that are selected to provide improved cycling performance. These materials can be effectively incorporated into negative electrode structures for batteries used for suitable applications, such as applications in which a moderate cycling performance is acceptable.

Lithium Ion Batteries

The batteries of particular interest herein are lithium ion batteries in which generally a non-aqueous electrolyte comprises lithium ions. For secondary lithium ion batteries, lithium ions are released from the negative electrode during discharge such that the negative electrode functions as an anode during discharge with the generation of electrons from the oxidation of lithium upon its release from the electrode. Correspondingly, the positive electrode takes up lithium ions through intercalation or other mechanism during discharge such that the positive electrode functions as a cathode which neutralizes the lithium ions with the consumption of electrons. Upon recharging of the secondary cell, the flow of lithium ions is reversed through the cell with the negative electrode taking up lithium and with the positive electrode releasing lithium as lithium ions. Rechargeable batteries have a range of uses, such as mobile communication devices, such as phones, mobile entertainment devices, such as MP3 players and televisions, portable computers, combinations of these devices that are finding wide use, as well as transportation devices, such as automobiles and fork lifts.

The desirable negative electrode materials described herein can be effectively incorporated into lithium ion batteries with desirable performance associated with the negative electrode. In some embodiments of improved batteries herein, high energy positive electrode materials can be effectively incorporated into the batteries to achieve extremely high performance values. The combination of high energy capacity negative electrode active materials and high energy capacity positive electrode materials can provide for particularly desirable performance for the resulting battery with respect to capacity and cycling. In particular, the ability to synthesize high energy density electroactive materials with a high tap density has been found to allow for positive electrodes at high active material loadings. Based on important advances with respect to positive electrode active materials, batteries can be formed having very high energy densities as well as high volumetric energies. Desirable battery designs based on high energy positive electrode materials are further described in copending patent application Ser. No. 12/403,521 to Buckley et al filed on Mar. 13, 2009 entitled "High Energy Lithium Ion Secondary Batteries", incorporated herein by reference. Further improvements can be expected for the combination with the desirable negative electrode materials described herein.

Battery Cell Design

Negative electrodes with the active materials described herein can be incorporated into various commercial battery cell designs. For example, the electrodes can be used for prismatic shaped cells, wound cylindrical cells, pouch cells, or other reasonable cell shapes. While the negative electrode can be used in batteries for primary, or single charge use, the resulting batteries generally have desirable cycling properties for secondary battery use over multiple cycling of the cells. The battery cells can comprise a single negative electrode structure or a plurality of negative electrode structures assembled in parallel and/or series electrical connection(s). For example, the electrodes described herein can be stacked with the separator between them, and the resulting stacked structure can be rolled into a cylindrical, prismatic, or other reasonable configuration to form the battery structure. Appropriate electrically conductive tabs can be welded or the like to the current collectors, and the resulting jellyroll or stacked structure can be placed into a metal canister or polymer package, which can be flexible, with the negative tab and positive tab welded to appropriate external contacts. Electrolyte is added to the canister or package, and the canister or package is sealed to complete the battery.

A schematic diagram of a pouch battery is shown in FIG. 1. Specifically a pouch cell battery 100 is shown schematically having a negative electrode 102, a positive electrode 104 and a separator 106 between negative electrode 102 and positive electrode 104. A battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors 108, 110 associated respectively with negative electrode 102 and positive electrode 104. The stack of electrodes and separators can be enclosed in a laminated film casing 112.

Commercial cells are generally designed to have an excess capacity in the negative electrode relative to the positive electrode so that the cells are not limited by the anode during discharge and so that lithium metal does not plate out on the negative electrode during recharge of the cell. Lithium metal can cause cycling problems as well as safety concerns due to the reactivity of the lithium metal. To achieve a desired high energy for the cell, the negative electrode structure can be made thicker so that the negative electrode can provide the appropriate capacity in view of very high positive electrode capacities.

The positive electrode active compositions and negative electrode active compositions generally are powder compositions that are held together in the corresponding electrode with a polymer binder. The binder provides ionic conductivity to the active particles when in contact with the electrolyte. Suitable polymer binders include, for example, polyvinylidine fluoride (PVDF), polyethylene oxide, polyethylene, polypropylene, polytetrafluoroethylene, polyacrylates, rubbers, e.g. ethylene-propylene-diene monomer (EPDM) rubber or styrene butadiene rubber (SBR), copolymers thereof and mixtures thereof. Rubber compositions have a desirable elastic modulus that can provide for adjustments for volume changes of the active material with potentially less mechanical destabilization of the electrode as a result of the cell cycling, which can be a particularly desirable feature for negative electrodes since the active material may undergo significant volume changes upon cycling. The positive electrode active material loading in the binder can be large, such as greater than about 80 weight percent. To form the electrode, the powders can be blended with the polymer in a suitable liquid, such as a solvent for the polymer. The resulting paste can be pressed into the electrode structure.

The positive electrode composition generally also comprises an electrically conductive powder distinct from the electroactive composition. Suitable supplemental electrically conductive powders include, for example, graphite, carbon black, graphite or carbon powders, carbon fibrils, carbon whiskers, metal powders, such as silver powders, carbon fibers, metal fibers, such as stainless steel fibers, and the like, and combinations thereof. While the composite compositions for the negative electrodes described herein may provide for electrical conductivity within the negative electrode structure, the negative electrode can optionally further comprise supplemental electrically conductive powders, such as the conductive powders above. In some embodiments, the negative electrode comprises no more than about 15 weight percent supplemental electrically conductive powders, in other embodiments no more than about 10 weight percent, and in additional embodiments from about 0.5 to about 8 weight percent supplemental electrically conductive powders. A person of ordinary skill in the art will recognize that additional ranges of conductive powder composition within the explicit ranges above are contemplated and within the present disclosure. While the supplemental electrically conductive compositions are described as powders, these materials lose their powder character following incorporation into the electrode where the associated particles of the supplemental electrically conductive material become a component of the resulting electrode structure.

The positive electrode generally is associated with an electrically conductive current collector to facilitate the flow of electrons between the electrode and an exterior circuit. The current collector can comprise metal, such as a metal foil, a metal grid or screen, or expanded metal. Expanded metal current collectors refer to metal grids with a greater thickness such that a greater amount of electrode material is placed within the metal grid. In some embodiments, the current collector can be formed from nickel, aluminum, stainless steel, titanium or the like. The electrode material can be cast in contact with the current collector. For example, in some embodiments, the electrode material in contact with the current collector foil or other structure can be subjected to a pressure from about 2 to about 10 kg/cm$^2$ (kilograms per square centimeter). The pressed structure can be dried, for example in an oven, to remove the solvent from the electrode. Metal foils can be used as current collectors. For example, copper foils can be used as current collectors for negative electrodes and aluminum foil can be used as positive electrode current collectors. Pastes or slurries of the cathode materials can be coated onto one or both sides of the foil. Then, the electrodes can be pressed using calendering rolls, a press with a die or other suitable processing apparatus to compress the electrodes to a desired thickness. In some embodiments, the positive electrodes can have an active material particle loading on each side of the current collector from 20 mg/cm$^2$ to 50 mg/cm$^2$. The positive electrodes can have a density of at least 2.5 grams per milliliter (g/mL), in further embodiments at least about 2.8 g/ml and in additional embodiments from about 3.0 g/mL to about 3.5 g/mL. A person of ordinary skill in the art will recognize that additional ranges of active material loading within the explicit range above are contemplated and are within the present disclosure.

In some embodiments, the negative electrodes can be similarly prepared with respect to contact of the electrode composition with the current collector as well as drying and pressing the resulting structure. In embodiments in which the negative electrode comprises a foamed electrically conductive current collector, the resulting electrode may not have a separate metal foil or metal grid current collector element. The formation of electrodes with foamed metal current collectors is described further below.

A separator generally is located between the positive electrode and the negative electrode. The separator is electrically insulating while providing for at least selected ion conduction between the two electrodes. A variety of materials can be used as separators. For example, glass fibers formed into a porous mat can be used as a separator. Commercial separator materials are generally porous sheets that provide for ionic conduction, and the sheets can be formed from polymers, such as polyethylene and/or polypropylene. Commercial polymer separators include, for example, the Celgard® line of separator material from Hoechst Celanese, Charlotte, N.C. Suitable separator materials include, for example, 12 micron to 40 micron thick trilayer polypropylene-polyethylene-polypropylene sheets, such as Celgard® M824, which has a thickness of 12 microns. Also, ceramic-polymer composite materials have been developed for separator applications. These composite separators can be stable at higher temperatures, and the composite materials can significantly reduce the fire risk. The polymer-ceramic composites for separator materials are described further in U.S. patent application 2005/0031942A to Hennige et al., entitled "Electric Separator, Method for Producing the Same and the Use Thereof," incorporated herein by reference. Polymer-ceramic composites for lithium ion battery separators are sold under the trademark Separion® by Evonik Industries, Germany.

Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl) methide, lithium tetrafluoroborate, lithium perchlorate, lithium tetrachloroaluminate, lithium chloride and combinations thereof. Traditionally, the electrolyte comprises a 1 M concentration of the lithium salts, although other concentrations can be used. In some embodiments, conventional electrolyte compositions can be used, such as a 1 molar solution of $LiPF_6$ in a blend of ethylene carbonate and dimethylcarbonate at a 1 to 1 by volume ratio. In some particular embodiments, solid electrolyte can be used, which generally also functions as the separator for electrodes. Solid electrolytes are described further, for example, in U.S. Pat. No. 7,273,682 to Park et al., entitled "Solid Electrolyte, Method for Preparing the Same, and Battery Using the Same," incorporated herein by reference.

For lithium ion batteries of interest, a non-aqueous liquid is generally used to dissolve the lithium salt(s). The solvent is generally inert and does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol) dimethyl ether), diglyme (diethylene glycol dimethyl ether), DME (glyme or 1,2-dimethyloxyethane or ethylene glycol dimethyl ether), nitromethane and mixtures thereof.

In some embodiments, the positive electrode and negative electrode can be stacked with the separator between them, and the resulting stacked structure can be rolled, for example, into a cylindrical or prismatic configuration to form the battery structure. Appropriate electrically conductive tabs can be welded or the like to the current collectors and the resulting jellyroll structure can be placed into a metal canister or polymer package, with the negative tab and positive tab welded to appropriate external contacts. Electrolyte is added to the canister, and the canister or package is sealed to complete the battery.

Some presently used rechargeable commercial cells include, for example, the cylindrical 18650 cells (18 mm in diameter and 65 min long) and 26700 cells (26 mm in diameter and 70 mm long), although other cell sizes can be used. Cylindrical cell is a widely used battery packaging format. The cylindrical shape of the cell has the ability to withstand high internal and external pressure. Additionally, cylindrical cells can have a venting mechanism to release excessive internal pressure. Because of its cylindrical shape and fixed sizes, however, cylindrical battery cell generally has poor space utilization and has to be designed around available cell sizes. In a cylindrical cell, the electrodes and separators can be made into long thin sheets and rolled into a spiral or jelly-roll shape optionally around a rod shaped mandrel. Alternatively, the electrodes can be wound onto a flat mandrel to provide flattened shape that can fit inside a prismatic case to make a prismatic cell. Electrodes can alternatively or additionally be stacked within a prismatic shaped cell.

Prismatic cells come in various sizes that can be custom-made to meet different size and energy demands. One version of a prismatic cell is referred to as a pouch cell, which generally has a heat-sealable foil to enclose rolled or stacked electrodes and separators as an alternative to a metal can. Pouch cell battery format generally allows tailoring to exact cell dimensions and makes the most efficient use of available space and can sometimes achieve a packaging efficiency of 90 to 95 percent, the highest among battery packs. Because of the absence of a metal can, the pouch cells can be generally light weight. Prismatic and pouch cell formats can contain a plurality of positive electrode sheets and negative electrode sheets that are sandwiched together in layers with separators in-between.

The specific negative electrode materials are described in detail in the following discussion along with some specific features for some of the electrodes. Due to the nature of the electrode active materials, the loading of active materials into the electrodes can be independently selected as appropriate for the particular electrode material. Generally, the electrodes independently comprise from 75 weight percent to about 99 weight percent, in other embodiments from about 78 weight percent to about 98 weight percent and in further embodiments form about 80 to about 96 weight percent active material. With respect to supplemental electrically conductive materials, the electrodes can independently comprise in some embodiments from about 0.1 to about 8 weight percent supplemental electrically conductive agent, in further embodiments from about 0.25 to about 6 weight percent electrically conductive agent and in additional embodiments form about 0.5 to about 5 weight percent electrically conductive agent. In general, the negative electrode may not comprise a supplemental electrically conductive agent since the electrode active material may be electrically conductive, but it may be desirable to include a supplemental electrically conductive material to further increase electrical conductivity or as a processing aid. Supplemental electrically conductive agents do not include compositions with reasonable reactive activity within the negative electrode with a blend of active compositions. In addition, the electrodes can independently comprise in some embodiments from about 0.5 to about 15 weight percent polymer binder, in further embodiments from about 1.0 to about 12 weight percent polymer binder and in additional embodiments from about 1.5 to about 10 weight percent polymer binder. A person of ordinary skill in the art will recognize that additional ranges of amounts of electrode compositions within the explicit ranges above are contemplated and are within the present disclosure. The compositions for the electrode do not include the mass of the current collector even for embodiments with a foamed current collector in which the electrode composition is intimately interspersed within the current collector structure.

Positive Electrode Active Material and Positive Electrode

In general, the positive electrode comprises a particulate composition that intercalates lithium ions during discharge of the battery. The positive electrode can comprise a binder to contribute to the integrity of the electrode, and the positive electrode can further comprise electrically conductive particles, as described above. Suitable active compositions for the positive electrode include, for example, lithium cobalt oxide, lithium nickel oxide, lithium manganese oxide and the like.

However, the negative electrode designs described herein are intended to introduce high energy density materials into the negative electrode. Thus, it can be advantageous to have high energy density positive electrode active materials in combination with the improved negative electrode structures described herein. It has been found that positive electroactive materials with a high energy density can be prepared with suitable properties, for example, tap density, such that the powders can be effectively assembled into batteries that have correspondingly high energies.

A class of desirable high energy density positive electrode active compositions are believed to have a composite crystal structure in which, for example, a $Li_2MnO_3$ is structurally integrated with either a layered $LiMnO_2$ component or a spinel $LiMn_2O_4$ component or similar composite compositions with the manganese ions substituted with other transition metal ions with equivalent oxidation states. In some embodiments, the positive electrode material can be represented in two component notation as $xLiMO_2 \cdot (1-x) Li_2M'O_3$ where M is one or more of trivalent metal ions with at least one ion being $Mn^{+3}$, $Co^{+3}$, or $Ni^{+3}$ and where M' is one or more tetravalent metal ions and $0<x<1$. These compositions are described further in U.S. Pat. No. 6,677,082 to Thackeray et al. (the '082 patent), entitled "Lithium Metal Oxide Electrodes for Lithium Cells and Batteries" and U.S. Pat. No. 6,680,143 to Thackeray et al. (the '143 patent), entitled "Lithium Metal Oxide Electrodes for Lithium Cells and Batteries," both of which are incorporated herein by reference. Thackery identified Mn, Ti and Zr as being of particular interest as M' and Mn and Ni for M. In other embodiments, the layered lithium rich compositions can be represented in two component notation as $x\ Li_2MnO_3 \cdot (1-x)LiMn_{2-y}M_yO_4$, where M is one or more metal cations. These compositions are described further in published U.S. patent application 2006/0051673 to Johnson et al., entitled "Manganese Oxide Composite Electrodes for Lithium Batteries," incorporated herein by reference.

It has also been found that metal and fluorine dopants can influence the capacity, impedance and cycling stability of the layered lithium metal oxide structures. These compositions with suitable metal and fluorine dopants can similarly be used in the batteries described herein. Some embodiments of these metal and halogen atom doped, e.g., fluorine doped, compositions are described further in U.S. Pat. No. 7,205,072 to Kang et al., entitled "Layered Cathode Materials for Lithium Ion Rechargeable Batteries," incorporated herein by reference. Positive electrode active materials with an optional fluorine dopant can be described by the formula $Li_{1+x}Ni_{\alpha}Mn_{\beta}Co_{\gamma}M_{\delta}O_{2-z/2}F_z$, where x ranges from about 0.05 to about 0.25, α ranges from about 0.1 to about 0.4, β range from about 0.4 to about 0.65, γ ranges from about 0.05 to about 0.3, δ ranges from about 0 to about 0.1 and z ranges from about 0 to about 0.1, and where M is Mg, Zn, Al, Ga, B, Zr, Ti, Ca, Ce, Y, Nb or combinations thereof. In embodiments in which z=0, this formula reduces to $Li_{1+x}Ni_{\alpha}Mn_{\beta}Co_{\gamma}M_{\delta}O_2$.

It has been found that suitable coatings provide desirable improvements in cycling properties without the use of a fluorine dopant, although it may be desirable to have a fluorine dopant in some embodiments. Furthermore, in some embodiments it is desirable to have δ=0 such that the compositions are simpler while still providing improved performance. For these embodiments, if z=0 also, the formula simplifies to $Li_{1+x}Ni_{\alpha}Mn_{\beta}Co_{\gamma}O_2$, with the parameters outlined above. Compositions represented with the formula $Li_{1+x}Ni_{\alpha}Mn_{\beta}Co_{\gamma}O_2$ can be alternatively written in the two component notation referenced above. A person of ordinary skill in the art will recognize that additional ranges of parameter values for the compositions within the explicit ranges above are contemplated and are within the present disclosure.

Appropriate coating materials can both improve the long term cycling performance of the material as well as decrease the first cycle irreversible capacity loss. While not wanting to be limited by theory, the coatings may stabilize the crystal lattice during the uptake and release of lithium ions so that irreversible changes in the crystal lattice are reduced significantly. In particular, metal fluoride compositions can be used as effective coatings. The general use of metal fluoride compositions as coatings for cathode active materials, specifically $LiCoO_2$ and $LiMn_2O_4$, is described in published PCT application WO 2006/109930A to Sun et al. (the '930 application), entitled "Cathode Active Material Coated with Fluorine Compound for Lithium Secondary Batteries and Method for Preparing the Same," incorporated herein by reference.

High specific capacities were obtained for $Li_{1+x}Ni_{\alpha}Mn_{\beta}Co_{\gamma}M_{\delta}O_{2-z/2}F_z$ compositions using synthesis approaches described in copending U.S. patent application Ser. No. 12/246,814 to Venkatachalam et al. (the '814 application) entitled "Positive Electrode Material for Lithium Ion Batteries Having a High Specific Discharge Capacity and Processes for the Synthesis of these Materials" and copending U.S. patent application Ser. No. 12/332,735 to Lopez et al. (the '735 application) entitled "Positive Electrode Material for High Specific Discharge Capacity Lithium Ion Batteries", both of which are incorporated herein by reference. In particular, surprisingly good results have been obtained for $Li[Li_{0.2}Ni_{0.175}Co_{0.10}Mn_{0.525}]O_2$. A carbonate co-precipitation process described in the '735 application gave desired lithium rich metal oxide materials having cobalt in the composition and exhibiting the high specific capacity performance with superior tap density. These copending patent applications also describe the effective use of coatings to improve performance and cycling.

In particular, it has been discovered that metal fluoride coatings can provide significant improvements for lithium rich layered positive electrode active materials described herein. These improvements relate to long term cycling with significantly reduced degradation of capacity, a significant decrease in first cycle irreversible capacity loss and an improvement in the capacity generally. The amount of coating material can be selected to accentuate the observed performance improvements. The bulk of the first cycle irreversible capacity loss is generally attributed to the positive electrode material.

However, the coating itself is not electrochemically active. When the loss of specific capacity due to the amount of coating added to a sample exceeds where the benefit of adding coating is offset by its electrochemical inactivity, reduction in battery capacity can be expected. In general, the amount of coating can be selected to balance the beneficial stabilization resulting from the coating with the loss of specific capacity due to the weight of the coating material that generally does not contribute directly to a high specific capacity of the material. In general, the amount of coating material ranges from about 0.01 mole percent to about 10 mole percent, in further embodiments from about 0.1 mole percent to about 7 mole percent, in additional embodiments from about 0.2 mole percent to about 5 mole percent, and in other embodiments from about 0.5 mole percent to about 4 mole percent. A person of ordinary skill in the art will recognize that additional ranges of coating material within the explicit ranges above are contemplated and are within the present disclosure. The amount of coating material effective in coated metal oxide materials to improve the capacity of the uncoated material is related to the particle size and surface area of the uncoated material. In particular, a higher mole percentage of metal fluoride coating generally can be used for a higher surface area powder to achieve an equivalent effect relative to a coating on a lower surface area powder.

The positive electrode active compositions can exhibit surprisingly high specific capacities in lithium ion cells under realistic discharge conditions. In some embodiments based on improved synthesis approaches, the lithium rich positive electrode active materials with the composite crystal structure can exhibit high specific capacity that is above 250 mAh/g at room temperature with good cycling properties for discharge from 4.6 volts. In some other embodiments, the lithium rich positive electrode active materials with the composite crystal structure used herein can exhibit high specific capacity that is above 235 mAh/g at room temperature with good cycling properties for discharge from 4.6 volts and high tap density above 1.8 g/mL. In general, when specific capacities are comparable, a higher tap density of a positive electrode material results in a higher overall capacity of a battery. It is noted that during charge/discharge measurements, the specific capacity of a material depends on the rate of discharge. A higher capacity of a specific cell is measured at very slow discharge rates relative to faster rates. In actual use, the actual capacity is less than the maximum capacity due to discharge at a finite rate. More realistic capacities can be measured using reasonable rates of discharge that are more similar to the rates during use. For low to moderate rate applications, a reasonable testing rate involves a discharge of the cell over three hours. In conventional notation this is written as C/3 or 0.33 C. The positive electrode active materials used herein can have a specific discharge capacity of at least about 250 mAh/g at a discharge rate of C/3 at the tenth discharge/charge cycle at room temperature when discharged from 4.6 volts. In some embodiments, the positive electrode active materials used herein can have a specific discharge capacity of at least about 250 mAh/g at a discharge rate of C/10 at room temperature when discharged from 4.6 volts and tap density above 1.8 g/mL.

The positive electrode material can be synthesized generally by co-precipitation processes or sol-gel processes detailed in U.S. application Ser. No. 12/246,814 to Venkatachalam et al. entitled "Positive Electrode Material for Lithium Ion Batteries Having a High Specific Discharge Capacity and Processes for the Synthesis of these Materials" and U.S. Application Ser. No. 12/332,735 to Lopez et al. entitled "Positive Electrode Material for High Specific Discharge Capacity Lithium Ion Batteries", both incorporated herein by reference. In some embodiments, the positive electrode material is synthesized by precipitating a mixed metal hydroxide or carbonate composition from a solution comprising +2 cations wherein the hydroxide or carbonate composition has a selected composition. The metal hydroxide or carbonate precipitates are then subjected to heat treatment etc. to form a crystalline layered lithium metal oxide composition.

Negative Electrode

To achieve the desired high energy for the cell, the negative electrode structure can be improved so that the negative electrode can provide the appropriate capacity, which can be particularly desirable for embodiments with very high positive electrode capacities. As described herein, the active negative electrode compositions can comprise composite materials that have at least one high energy phase, which can be combined with additional components that contribute to more stable cycling of the materials. In particular, the desirable negative electrode active materials generally comprise elemental tin, which may be combined with graphitic carbon and/or elemental silicon. The graphitic carbon can contribute to the cycling stability of the material. Also, additional phases, which may be inactive, may also contribute to the cycling stability, and these additional phases may be crystalline to encourage an amorphous character to the tin and/or silicon phases.

Suitable negative electrodes for lithium secondary batteries can comprise a negative electrode active material, and the negative electrodes are generally combined with a current collector for incorporation into a battery. Generally, a polymer binder can be used to maintain the physical integrity of the electrode while holding a particulate active material within the structure, and suitable binders are described above. For commercial batteries, high energy density active materials correspond with a higher capacity while the better cycling properties result in a battery with a longer life time. The negative electrode structures incorporating the composite active materials described herein are designed to provide higher energy density negative electrodes while providing suitable cycling properties for at least certain applications. The particular negative electrode material influences the discharge voltage of the resulting cell based on a comparison of the half reactions at the negative electrode and the positive electrode.

The negative electrodes described herein can take advantage of the properties of particular composite active materials, which have compositions intended to result in a high energy density. Furthermore, in some embodiments metal composite active materials can be used with a submicron average particle size. The high surface area of the submicron active materials can result in further improved cycling properties. Suitable metal composite compositions are described in detail below. As used herein, composites broadly describe combinations of materials generally without reference to the specific structure of the materials. Metal compositions, such as metal oxides, metal nitrides, metal carbides, metal sulfides and the like, can be in identifiable phases. However, blends of elemental metals and/or other metal elements may have a plurality of identifiable phases, layered or other complex structure, homogenous alloy phases or combinations thereof. For example, a blend of elemental tin and another elemental metal can form a multiple phased material, an alloy, an intermetallic composition or a combination thereof. We call all of these blends of metals composites whether or not they form distinct phases. Metalloids such as silicon can be evaluated along with metals in this analysis. Carbon can be a component of a composite either as a distinct elemental carbon phase, such as a graphite phase, or as a distinct metal/metalloid carbide phase.

Alloys are homogeneous mixtures or solid solutions of metal elements, optionally with some amounts of non-metal atoms dissolved into the metal. While many alloys have a plurality of metal elements, some alloys are alloys of a metal with a relatively low amount of a non-metal additive, such as steel which is iron with a low amount of carbon additive, which results in a homogenous metallic composition. Intermetallic materials are solid phases with two or more metal/metalloid elements, optionally with non-metal elements, with a structure different from the crystal of the constituent materials.

In some embodiments, the composite compositions described herein can be processed to maintain an amorphous or low crystallinity nature of the material to improve the cycling performance. In particular, while transition metals favor a crystalline structure, more complex alloys can assume an amorphous character. Furthermore, some of the composites have multiple phases. A crystalline phase, such as an inactive carbide or an active graphite phase, can encourage an amorphous character for adjacent active phases, such as an active tin phase, an active silicon phase or active alloys thereof.

Although some negative electrode active materials, such as elemental tin and/or elemental silicon, have the potential to provide increased energy density, these alternatives materials have been found to be unsuitable commercially due to poor discharge and recharge cycling related to structural changes and anomalously large volume expansions, especially for silicon, that are associated with lithium intercalation/alloying. The structural changes and large volume changes can destroy the structural integrity of the electrode, thereby decreasing the cycling efficiency.

To obtain high energy density negative electrodes having acceptably small structural and volume alterations during charge/discharge cycles, composites described herein can be used in the negative electrodes, and further improvement may be possible through the formation of the composites as submicron particles. In addition, in some embodiments, the particles can be combined with highly porous electrically conductive structures that can provide for reduced strain upon cycling. If the negative electrode active materials are made into submicron sized particles, these particles may fit into the pores of the highly porous electrically conductive structures.

As noted above, some embodiments of the negative electrode can comprise or be associated with electrically conductive structures with a porous nature that can accommodate volume changes of the active material. While not intending to be limited by theory, it is believed that the highly porous material provides some void volume. The void volume moderates volume expansion of the negative electrode material during charging with lithium to reduce stress within the active material. Stress reduction may also occur by reducing the particle size and/or by reducing the crystallinity of some high energy phases. It is believed that the stress reduction can result in a corresponding decrease in irreversible structural changes in the material upon cycling such that the performance of the negative electrode degraded more slowly upon cycling, and a battery formed with the negative electrode can have satisfactory performance over a larger number of battery cycles. Suitable highly porous electrically conductive materials include, for example, foamed metal current collectors, foamed carbon current collectors and highly porous carbon particles. The use of submicron active particles can result in improved incorporation of the active material into the highly porous structure for improved synergy.

Appropriate metal composites comprising tin are of interest as a negative electrode active material due to their high energy density and moderate volume change upon cycling. Particular composites are presented in the following discussion. Suitable processing approaches are also discussed for forming the composites.

Active Composite Materials

Several classes of composites are described herein with the common feature of having elemental tin as a high energy active material. One type of these composite materials comprises an active graphitic carbon phase along with the active elemental tin. Another type of the composite comprises active elemental silicon in addition to the active elemental tin. A third type of composites have at least one weight percent of each of zinc, tin, and carbon along with at least about 1 weight percent of silicon or copper. Each of these composites can be selected to have a high energy density component in a structure that is selected to stabilize cycling of the material in a lithium ion battery.

Some of the composites having active tin and active carbon can be represented by the formula $Si_wSn_xM_yC_z$, where w, x, y and z are weight percents, $w \geq 0$, $3 \leq x \leq 25$, $y \geq 0$, $50 \leq z \leq 95$, $1 \leq (w+y) \leq 35$, and M is a metal atom selected from the group consisting of Fe, Ni, Co, Mn, Zn, V, Cr, Mo, Nb, Ta, Zr, B, Al, Ti, Mg and combinations thereof. With respect to the metal M, it is noted that Fe, Ni, Co, Mn, Zn, V, Cr, Mo, Nb, Ta, Zr, Ti are transition metals, and B, Al and Mg are non-transition metals. In these embodiments, the composite materials can comprise an active tin phase and a distinct active carbon phase. Any silicon present may react with carbon in the synthesis process to form silicon carbide. The metal, for example, may react with the silicon to form a metal silicide, a metal silicon alloy, an alloy with the tin and/or a separate elemental metal phase.

If silicon is present in these embodiments, w of the formula in the previous paragraph can be $0.5 \leq w \leq 35$, in further embodiments $1 \leq w \leq 25$, in other embodiments $2 \leq w \leq 20$ and in additional embodiments $3 \leq w \leq 15$. Similarly, if metal M is present in the composite, y of the formula of the previous paragraph can be $0.5 \leq y \leq 35$, in further embodiments $1 \leq y \leq 25$, in other embodiments $2 \leq y \leq 20$ and in additional embodiments $3 \leq y \leq 15$. With respect to the tin component, in some embodiments x in the formula of the previous paragraph can be $5 \leq x \leq 23$, in further embodiments $7 \leq x \leq 22$, in other embodiments $8 \leq x \leq 21$ and in additional embodiments $10 \leq x \leq 20$. With respect to the carbon component, in some embodiments z in the formula of the previous paragraph can be $55 \leq z \leq 95$, in further embodiments $57 \leq z \leq 90$, in other embodiments $60 \leq z \leq 85$ and in additional embodiments $65 \leq z \leq 80$. Generally, in these embodiments, the silicon and/or metal M components provide for stabilization of the resulting composite with respect to cycling. In some embodiments, the sums of w and y can be selected with $2 \leq (w+y) \leq 30$, in further embodiments $3 \leq (w+y) \leq 33$, in other embodiments $5 \leq (w+y) \leq 30$ and in additional embodiments $10 \leq (w+y) \leq 25$. A person of ordinary skill in the art will recognize that additional ranges of composition parameters within the explicit ranges above are contemplated and are within the present disclosure. Also, these parameters are real numbers with inherent uncertainty in their evaluation that makes them approximations as would be recognized by a person of ordinary skill in the art even though not explicit stated with respect to the recitation of the parameters.

Some of the composite embodiments having an active tin and an active silicon layer can be characterized by the formula $Si_wSn_xM_yC_z$, where w, x, y and z are weight percents, $10 \leq w \leq 70$, $8 \leq x \leq 50$, $y \geq 0$, $z \geq 0$, $5 \leq (y+z) \leq 50$, and M is a metal atom selected from the group consisting of Fe, Ni, Co, Mn, Zn, V, Cr, Mo, Nb, Ta, Zr, B, Al, Ti, Mg and combinations thereof. With respect to the metal M, it is noted that Fe, Ni, Co, Mn, Zn, V, Cr, Mo, Nb, Ta, Zr, Ti are transition metals, and B, Al and Mg are non-transition metals. If any carbon is present, the carbon generally reacts during the synthesis step to form silicon carbide. The metal may form a metal silicide, a metal silicon alloy, an alloy with tin, or a distinct elemental metal phase.

For embodiments in which carbon is present, z of the formula of the previous paragraph can be $0.5 \leq z \leq 50$, in further embodiments $1 \leq z \leq 40$, in other embodiment $2 \leq z \leq 35$ and in additional embodiments $5 \leq z \leq 30$. Furthermore, in some embodiments z can be in the ranges $z \leq w-1$ and in further embodiments $5 \leq z \leq w-5$ For embodiments in which metal M is present, y of the formula of the previous paragraph can be $0.5 \leq y \leq 50$, in further embodiments $1 \leq y \leq 40$, in other embodiment $2 \leq y \leq 35$ and in additional embodiments $5 \leq y \leq 30$. With respect to the tin component, in some embodiments x in the formula of the previous paragraph can be $10 \leq x \leq 50$, in further embodiments $12 \leq x \leq 45$, in other embodiments $15 \leq x \leq 42$ and in additional embodiments $20 \leq x \leq 40$. With respect to the silicon component, in some embodiments w in the formula of the previous paragraph can be $12 \leq w \leq 65$, in further embodiments $15 \leq w \leq 60$, in other embodiments $20 \leq w \leq 65$ and in additional embodiments $25 \leq w \leq 50$. Generally, in these embodiments, the carbon and/or metal M components provide for stabilization of the resulting composite with respect to cycling. In some embodiments, the sums of y and z can be selected with $8 \leq (y+z) \leq 45$, in some embodiments $10 \leq (y+z) \leq 40$, in further embodiments $12 \leq (y+z) \leq 35$ and in additional embodiments $15 \leq (y+z) \leq 30$. In some of these embodiments the composite has elemental silicon present that is active in the battery, and for these embodiments w may be appropriately selected in view of values for y and z. In some embodiments, the composite has at least about 1 weight percent active silicon, in further embodiments from about 3 weight percent to about 65, in other embodiments from about 5 to about 55, in additional embodiments from about 10 to about 50 and in more embodiments from about 12 to about 40 weight percent. The amount of active silicon can be evaluated using spectroscopic techniques, such as infrared spectroscopy, or using electrochemical measurements. A person of ordinary skill in the art will recognize that additional ranges of composition parameters within the explicit ranges above are contemplated and are within the present disclosure. Also, these parameters are real numbers with inherent uncertainty in their evaluation that makes them approximations as would be recognized by a person of ordinary skill in the art even though not explicit stated with respect to the recitation of the parameters.

As noted above, some composites of interest can be represented by the formula $Si_wZn_xSn_yC_z$, $Cu_wZn_xSn_yC_z$ or combinations thereof where w, x, y and z are weight percents and w, x, y, and z are each greater than 1. These composites generally have an active tin contribution, and they can optionally further have an active carbon or active silicon contribution depending on the amounts of the elements in the composites. The composition can be substantially free of boron, aluminum, or phosphorous. In some embodiments, the composition can be in the form of amorphous particles. In some embodiments, the x, y, w, and z are selected such that each element is present in at least 5 weight percent. In some embodiments, the composition can comprise greater than 50 weight percent carbon. Composite embodiments represented by the formula $Si_w Zn_x Sn_y C_z$ can have active silicon with w>z, and generally at least a fraction of the silicon can be in the form of silicon carbide. These compositions overlap with the composites represented by other formulas when M=Zn.

The composites with the formula $Cu_w Zn_x Sn_y C_z$ generally can have an active tin contribution and an active carbon contribution. The copper, zinc and tin can form an alloy and/or distinct phases or various combinations thereof depending on the relative amounts of the elements. In some embodiments, the parameters of the composite can be $5 \leq w \leq 60$, $5 \leq x \leq 50$, $5 \leq y \leq 50$, and $10 \leq z \leq 93$. With respect to carbon, the composite can have in some embodiments, $20 \leq z \leq 90$, in further embodiments $20 \leq z \leq 85$, in other embodiments $30 \leq z \leq 80$ and in additional embodiments $40 \leq z \leq 75$. With respect to tin, the composite can have in some embodiments $8 \leq y \leq 45$, in further embodiments $10 \leq y \leq 40$, in other embodiments $12 \leq y \leq 35$ and in additional embodiments $15 \leq y \leq 30$. With respect to zinc, the composite can have in some embodiments $10 \leq x \leq 45$, in further embodiments $15 \leq x \leq 40$ and in other embodiments $20 \leq x \leq 35$. With respect to the copper, the composite can have in some embodiments $10 \leq w \leq 55$, in further embodiments $15 \leq w \leq 50$, in additional embodiments $20 \leq w \leq 45$ and in other embodiments $25 \leq w \leq 40$. A person of ordinary skill in the art will recognize that additional ranges of composition parameters above within the explicit ranges are contemplated and are within the present disclosure. Also, these parameters are real numbers with inherent uncertainty in their evaluation that makes them approximations as would be recognized by a person of ordinary skill in the art even though not explicit stated with respect to the recitation of the parameters.

With respect to the composite materials described herein, submicron composite particles can reduce some of the structural changes that take place at the particles as a result of lithium intercalation or alloying. In particular, submicron particles have a significantly larger surface area. Due to the larger surface area, elements can be released from the particles, and surface restructuring can be accommodated, both with reduced overall structural changes in the particles and with reduced volume changes. Thus, the submicron or nanoscale powders can exhibit improved cycling properties. The submicron metal alloy/intermetallic particles can be formed through milling of initially submicron or nanoscale starting powders to form the alloys, which can have stoichiometries within the ranges described above for the particular intermetallic compositions. In general, the submicron metal particles, e.g., alloys or intermetallics, can have an average diameter of no more than a micron, in some embodiments no more than 500 nanometers (nm), in additional embodiments no more than 250 nm, in other embodiments no more than about 100 nm and in further embodiments from about 5 nm to about 60 nm. A person of ordinary skill in the art will recognize that additional ranges within these explicit ranges of average diameters are contemplated and are within the present disclosure. The particle diameter can be measured as an average of the lengths along the three principle axes of the particle for particles that are not spherical. The particle diameters can be evaluated using transmission electron microscopy.

In general, amorphous material phases comprising active tin and/or active silicon can have improved cycling since structural changes associated with lithium intercalation or alloying may not result in propagating lattice disruptions, which can magnify structural and volume changes. Therefore, it can be desirable to process the materials to favor the formation of amorphous or less crystalline active phases of the composite materials. Active graphitic carbon phase, however, should be preserved with their graphitic crystal structure to maintain the activity of the phase. In particular, the composite materials can be formed by milling starting materials as powders with the desired structural form. In particular, the starting materials can comprise amorphous tin powders and graphitic carbon. In this way, composite particles can be formed with a selected composition range and desired structures.

In particular, composite materials can be formed by milling, such as ball milling, appropriately selected starting materials as powders. For example, to obtain submicron composite particles, it can be desirable to start with starting materials that are also submicron powders. Similarly, amorphous tin particles and/or amorphous silicon particles can be used as starting materials. Submicron metal powders are available, for example, from Sigma-Aldrich, WI, U.S., American Elements, CA, U.S. and MTI Corporation, CA, U.S. Also, suitable graphitic carbon particles are commercially available.

As noted above, milling can be a suitable approach for the formation of composite powders, although alternative alloying approaches can be used in some embodiments. However, as noted above, milling can be desirable from a particle size perspective as well as allowing retention of a low level of crystallinity or amorphous character with respect to tin and/or silicon active phases. Suitable milling can be performed with, for example, commercially available equipment and methods using ball mills, bead mills, attritors, shaker mills or rod mills. Both laboratory scale and commercial scale milling apparatuses can be purchased, such as a Paul O. Abbé Lab Jar Rolling Mill with suitable grinding media. The milling jar can be filled with argon or other inert gas during the milling process to reduce or eliminate oxidation during the synthesis process. The milling time, rotation speed, amount of feed material, and amount of grinding media can be selected to achieve desired grinding results with a homogeneous product with a particular mill. Some other process agents, such as organic acids, alcohols, heptanes, aldehydes, ether or combinations thereof, may also be added to the jar prior to milling. Examples of suitable grinding media include, for example, zirconia, alumina, tungsten carbide, and the like. The composite particles can be analyzed for crystallinity using an x-ray diffraction pattern, and surface area can be measured using the BET technique. The particle size can be measured from transmission electron micrographs.

In general, the composite active materials can be incorporated into an electrode structure with a polymer binder, optional supplemental electrically conductive particle, and the electrode structure can be combined with a traditional current collector as described above. In some embodiments, the negative electrode can comprise highly porous electrically conductive materials, such as porous conductive carbon particles or a foamed current collector. A foamed current collector can replace a convention current collector in some embodiments. The foamed current collectors generally can be formed from suitable metals or conductive carbon material. The foamed materials can be formed, for example, through the use of a pore forming agent that can be removed from the structure upon formation of the structure. The foamed current collectors generally have an open cell structure with a high level of porosity. The cell size can also be selected to facilitate incorporation of the particular active material. Also, an active material with a submicron average particle size can be effectively incorporated into a foamed metal current collector for reasonable cell sizes. In general, the thickness of the foamed current collector can be selected based on several factors such as the battery form factor, the volume capacity of the negative electrode and the properties of the positive electrode, accounting for any compression of the current collector during any compression steps.

In general, the active material can be incorporated into a paste or dispersion. The paste or dispersion can comprise a polymer binder as well as optional supplemental electrically conductive particles. The concentration of the paste or dispersion can be adjusted to achieve a desired viscosity for effective incorporation into the foamed current collector. The paste or dispersion can be applied to the foamed current collector using any appropriate technique, such as spreading, spraying, immersion or the like. The use of active material with a submicron average particle size can facilitate the incorporation of the active material within the foamed current collector structure. After the negative electrode composition is applied to the foamed conductive current collector, the electrode can be dried to remove the solvent. Before or after drying, the foam current collector can be compressed to reduce the volume of the foamed current collector, and the compression can improve the electrical contact between the active material and the metal of the foamed current collector.

Suitable high surface area porous carbons include, for example, activated carbon, mesoporous carbon, and the like. In general, the high surface area porous carbon can have a BET surface area of at least about 250 m$^2$/g, in further embodiments at least about 255-500 m$^2$/g and in additional embodiments from about 550 to about 3500 m$^2$/g. Commercially available activated carbon powders are available from Aldrich chemical with a surface area of 600 or 750 m$^2$/g and activated carbon powder with a surface area of 1000 m$^2$/g is available from General Carbon Corp, NJ, USA.

In general, the composite particles can be dispersed in a liquid along with the highly porous carbon articles although the order of adding the particles can be selected to achieve the desired results. The concentration of the particles in the dispersion can be selected also to achieve desired results. The dispersions with the combination of particles can be mixed and/or sonicated to facilitate the blending of the materials. After a desired degree of blending, the particle blend can be separated from the liquid through drying, filtration, centrifugation or the like. Following formation of this blend, the blend can be formed into an electrode with conventional current collector and/or with a foamed current collector as described herein.

The use of highly porous electrically conductive materials in negative electrodes for lithium ion batteries is discussed in greater detail in copending U.S. patent application Ser. No. 12/429,438 to Kumar et al. filed on Apr. 24, 2009, entitled "Lithium Ion Batteries with Particular Negative Electrode Compositions," incorporate herein by reference.

The performance of the materials described herein can be tested at a laboratory scale, for example, using coin cell designs. The positive electrode can be fabricated by mixing a powder of active material, such as lithium cobalt oxide, with acetylene black and then with a binder, such as polyvinylidene fluoride (PVDF), which can be dissolved in N-methyl-pyrrolidone (NMP). The resulting slurry can be cast on an aluminum foil current collector. Electrodes with a loading between 2 and 10 mg/cm$^2$ (milligrams per square centimeter) can be dried for 24 hours in a vacuum oven maintained at a temperature from 100° C. to 120° C.

Similarly, to form the negative electrode, the composite powder blended in a solution with a PVDF binder can be cast with NMP onto a copper current collector, such as a copper foil. The cast negative electrode can be dried in an oven at a temperature from 100° C. to 120° C. for 24 hours. A Celgard® separator material (polypropylene/polyethylene/polypropylene) can be used between the negative electrode and positive electrode. Before assembling the cell, the separator material can be soaked in electrolyte, 1M LiPF$_6$ in ethylene carbonate/diethyl carbonate (1:1) solvent. The assembled cathode-separator-anode structure is sealed within the coin cell. Several coin cells can be assembled for each sample in a dry box, and the cell performance can be tested with a commercial cycle tester, such as using commercial testing equipment from Maccor, Inc. Tulsa, Okla. Similarly, electrodes formed with inter-metallic powders can be tested as negative electrodes against positive electrodes.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

I claim:

1. A composition comprising a particulate material characterized by the formula $Si_wSn_xM_yC_z$, where w, x, y and z are weight percents, $1 \leq w \leq 25$, $3 \leq x \leq 25$, $y \geq 0$, $50 \leq z \leq 95$, $1 \leq (w+y) \leq 35$, and M is a metal atom selected from the group consisting of Fe, Ni, Co, Mn, Zn, V, Cr, Mo, Nb, Ta, Zr, B, Al, Ti, Mg and combinations thereof.

2. The composition of claim 1 wherein the composition comprises a phase with amorphous tin.

3. The composition of claim 1 wherein the composition has the form of a powder having an average particle size of no more than a micron.

4. The composition of claim 1 wherein $z \geq 55$.

5. The composition of claim 1 wherein $60 \leq z \leq 85$.

6. The composition of claim 1 wherein $7 \leq x \leq 22$.

7. A secondary lithium ion battery comprising a negative electrode, a positive electrode comprising a lithium intercalation composition and a separator between the positive electrode and the negative electrode, wherein the negative electrode comprises the composition of claim 1.

8. A composition comprising a particulate material characterized by the formula $Si_wSn_xM_yC_z$, where w, x, y and z are weight percents, $15 \leq w \leq 70$, $8 \leq x \leq 50$, $y \geq 0$, $z \geq 15$, $5 \leq (y+z) \leq 50$, and M is a metal atom selected from the group consisting of Fe, Ni, Co, Mn, Zn, V, Cr, Mo, Nb, Ta, Zr, B, Al, Ti, Mg and combinations thereof.

9. The composition of claim 8 wherein the composition comprises a phase with amorphous silicon.

10. The composition of claim 8 wherein the composition has the form of a powder having an average particle size of no more than a micron.

11. The composition of claim 8 wherein $10 \leq x \leq 50$.

12. The composition of claim 8 wherein $20 \leq x \leq 40$.

13. The composition of claim 8 wherein $15 \leq w \leq 60$.

14. The composition of claim 8 wherein $15 \leq z \leq w-5$.

15. A secondary lithium ion battery comprising a negative electrode, a positive electrode comprising a lithium intercalation composition and a separator between the positive electrode and the negative electrode, the negative electrode comprising the composition of claim 8.

16. The composition of claim 8 wherein $5 \leq y \leq 30$.
17. The composition of claim 8 wherein $12 \leq x \leq 45$.
18. The composition of claim 8 wherein $15 \leq x \leq 42$.
19. The composition of claim 8 wherein $12 \leq w \leq 65$.
20. The composition of claim 8 wherein $20 \leq w \leq 65$.
21. The composition of claim 8 wherein $25 \leq w \leq 50$.
22. The composition of claim 8 wherein $8 \leq (y+x) \leq 45$.
23. The composition of claim 8 wherein $10 \leq (y+x) \leq 40$.
24. The composition of claim 8 wherein $12 \leq (y+x) \leq 35$.
25. The composition of claim 8 wherein $15 \leq (y+x) \leq 30$.
26. A composition comprising a particulate material characterized by the formula $Si_w Sn_x M_y C_z$, where w, x, y and z are weight percents, $10 \leq w \leq 70$, $8 \leq x \leq 50$, $y > 0$, $z \geq 5$, $5 \leq (y+z) \leq 50$, and M is a metal atom selected from the group consisting of Fe, Ni, Co, Mn, Cr, Mo, Nb, Ta, Mg and combinations thereof.

* * * * *